United States Patent
Kholaif et al.

(10) Patent No.: US 10,367,608 B2
(45) Date of Patent: Jul. 30, 2019

(54) WIRELESS COMMUNICATION CHANNEL SCAN

(71) Applicant: HEWLETT PACKARD ENTERPRISE DEVELOPMENT LP, Houston, TX (US)

(72) Inventors: Ahmad Kholaif, Santa Clara, CA (US); Shahnawaz Siraj, Santa Clara, CA (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 0 days.

(21) Appl. No.: 15/726,861

(22) Filed: Oct. 6, 2017

(65) Prior Publication Data

US 2019/0109673 A1    Apr. 11, 2019

(51) Int. Cl.
*H04L 1/12*    (2006.01)
*H04L 1/16*    (2006.01)
*H04L 1/18*    (2006.01)

(52) U.S. Cl.
CPC .......... *H04L 1/1621* (2013.01); *H04L 1/1851* (2013.01); *H04L 2001/125* (2013.01)

(58) Field of Classification Search
CPC ... H04L 1/1621; H04L 1/1628; H04L 1/1851; H04L 2001/125
See application file for complete search history.

(56) References Cited

U.S. PATENT DOCUMENTS

| 6,507,742 | B1 | 1/2003 | Lin et al. |
| 8,175,539 | B2 | 5/2012 | Diener et al. |
| 9,825,678 | B2 * | 11/2017 | Chu ................... H04W 72/1289 |
| 2005/0135284 | A1 * | 6/2005 | Nanda ............... H04L 29/06068 370/294 |
| 2009/0290551 | A1 * | 11/2009 | Ku ....................... H04W 72/06 370/329 |

(Continued)

FOREIGN PATENT DOCUMENTS

| WO | WO-2016112306 | 7/2016 |
| WO | WO-2017004491 | 1/2017 |
| WO | WO-2017074578 | 5/2017 |

OTHER PUBLICATIONS

Omar et al.; "A Survey on High Efficiency Wireless Local Area Networks: Next Generation Wifi"; Apr. 14, 2016; 30 pages.

*Primary Examiner* — Kevin D Mew
(74) *Attorney, Agent, or Firm* — Hewlett Packard Enterprise Patent Department

(57) ABSTRACT

An example access point may include a memory and a processor executing instructions from the memory to receive an instruction to start a scan on a different wireless communication channel than an operating channel of the access point; transmit a Clear To Send-to-self frame on the operating channel of the access point, to notify client devices associated with the AP and at least a neighboring AP that the operating channel is busy, wherein the control frame includes a basic service set color associated with the access point; scan on the different wireless communication channel subsequent to transmitting the Clear To Send-to-self frame; and defer a subsequent data transmission received from the client devices in response to the data transmission including the basic service set color associated with the access point.

15 Claims, 3 Drawing Sheets

(56) References Cited

U.S. PATENT DOCUMENTS

| | | | |
|---|---|---|---|
| 2010/0157865 A1* | 6/2010 | Iyer | H04W 52/0216 |
| | | | 370/311 |
| 2014/0211674 A1 | 7/2014 | Hiremath | |
| 2014/0334473 A1* | 11/2014 | Zhang | H04B 7/0617 |
| | | | 370/338 |
| 2015/0358067 A1* | 12/2015 | Zhang | H04W 52/0216 |
| | | | 370/315 |
| 2016/0128062 A1* | 5/2016 | Coffey | H04W 74/06 |
| | | | 370/336 |
| 2016/0142980 A1* | 5/2016 | Lee | H04W 52/18 |
| 2016/0150550 A1* | 5/2016 | Park | H04L 5/0055 |
| | | | 370/329 |
| 2016/0330788 A1* | 11/2016 | Zheng | H04W 76/04 |
| 2016/0345362 A1* | 11/2016 | Lee | H04W 74/0816 |
| 2016/0359572 A1* | 12/2016 | Zhou | H04W 74/0816 |
| 2016/0360528 A1* | 12/2016 | Kim | H04W 72/0446 |
| 2017/0013645 A1* | 1/2017 | Choi | H04W 74/0816 |
| 2017/0064711 A1 | 3/2017 | Choi et al. | |
| 2017/0202019 A1* | 7/2017 | You | H04W 16/14 |
| 2017/0257344 A1* | 9/2017 | Huang | H04L 61/6022 |
| 2017/0294949 A1* | 10/2017 | Zhang | H04B 7/0617 |
| 2018/0092127 A1* | 3/2018 | Park | H04W 74/0816 |
| 2018/0131471 A1* | 5/2018 | Ahn | H04L 1/16 |
| 2018/0176952 A1* | 6/2018 | Tomeba | H04W 74/085 |

\* cited by examiner

WIRELESS COMMUNICATION CHANNEL SCAN

BACKGROUND

An access point may switch to a different wireless communication channel to scan for other access points and client devices. During such a scan, a client device may attempt a data transmission, resulting in retries and data loss.

BRIEF DESCRIPTION OF THE DRAWINGS

Non-limiting examples of the present disclosure are described in the following description, read with reference to the figures attached hereto and do not limit the scope of the claims. In the figures, identical and similar structures, elements or parts thereof that appear in more than one figure are generally labeled with the same or similar references in the figures in which they appear. Dimensions of components and features illustrated in the figures are chosen primarily for convenience and clarity of presentation and are not necessarily to scale. Referring to the attached figures:

DETAILED DESCRIPTION

Figure 1:
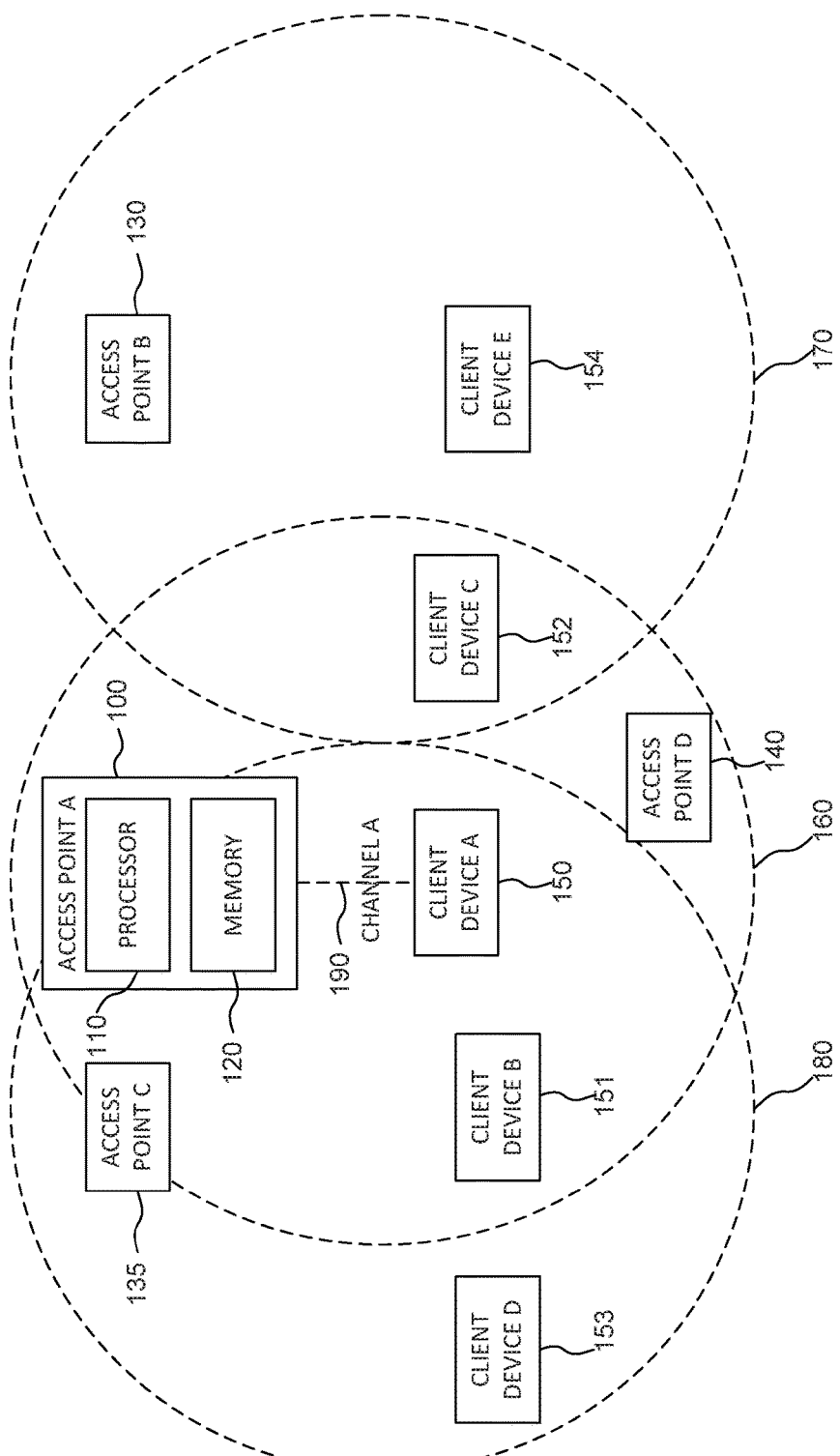
FIG. 1 is a block diagram of an example access point including a processor and memory, neighboring access points, and client devices.

In the following detailed description, reference is made to the accompanying drawings which form a part hereof, and in which is depicted by way of illustration specific examples in which the present disclosure may be practiced. It is to be understood that other examples may be utilized and structural or logical changes may be made without departing from the scope of the present disclosure.

An access point (AP) may switch to a different wireless communication channel to scan for other access points and client devices. During such a scan, a client device may attempt a data transmission, resulting in retries and data loss.

Examples described herein may utilize an AP which includes a machine-readable storage medium or memory and a processor to execute instructions stored in the machine-readable storage medium or memory. The AP may receive instructions to scan a wireless communication channel other than the operating channel of the AP for other APs or client devices. The other APs may be rogue APs. The AP may have neighbor APs which operate in the same operating channel of the AP. The AP, in response to the instructions to scan, may send a Clear To Send (CTS)-to-self frame to the operating channel of the AP. The CTS-to-self frame may include a basic service set (BSS) color associated with the AP. The CTS-to-self frame may notify client devices associated with the AP and notify neighbor APs operating at the channel of the AP of the wireless communication channel scan. Stated another way, the CTS-to-self frame may notify client devices associated with the AP and notify neighbor APs operating at the channel of the AP that the operating channel may be busy. Neighbor APs may have a different associated BSS color. In an example, a neighbor APs associated BSS color may not match the BSS color of the CTS-to-self frame. In such examples, the wireless communication channel scan may not impact the neighbor APs wireless access service. In the example that the neighbor APs BSS color does match the BSS color of the CTS-to-self frame, the neighbor AP may set a clear channel assessment (CCA) state to busy. When the CCA state is set to busy, the neighbor AP will refrain from transmitting on the wireless communication channel. Client devices may send data transmissions to the AP during the scan of the wireless communication channel. The data transmissions may include a BSS color. During the wireless communication channel scan, the AP may defer any data transmissions that include the BSS color associated with the AP.

For example, an AP may include a memory and a processor. The processor may execute instructions from the memory to receive an instruction to start a scan on a different wireless communication channel than an operating channel of the AP. The processor may also execute instructions from the memory to transmit a CTS-to-self frame on the operating channel of the AP, to notify client devices associated with the AP and at least a neighboring AP that the operating channel is busy. The CTS-to-self frame may include a BSS color associated with the AP. The processor may also execute instructions from the memory to scan, on the different wireless communication channel, subsequent to transmitting the CTS-to-self frame. The processor may also execute instructions to defer a subsequent data transmission received from the client devices in response to the data transmission including the BSS color associated with the AP.

FIG. 1 is a block diagram of an example AP 100 including a processor 110 and memory 120, neighboring access points 130, 135, and client devices 150, 151, 152, 153, 154. AP A 100 may include a processor 110 and memory 120. The memory 120 may store instructions. The processor 110 may execute instructions stored in the memory 120. Client devices, such as client device A 150, may associate with AP A 100. AP A 100 may operate at an operating channel, such as channel A 190. In some examples, other APs, such as AP B 130 and AP C 135, may operate at the same operating channel (e.g., channel A 190) as AP A 100. AP A 100 may provide wireless access service, as well as other services, to a coverage area 160. In some examples, the coverage area of the other APs, such as coverage area 170 of AP B 130 and coverage area 180 of AP C 135, may overlap with the coverage area 160 of AP A 100. The processor 110 may execute instructions stored in the memory 120 to receive an instruction to start a scan on a different wireless communication channel. The different wireless communication channel may be a different channel than the operating channel (e.g., channel A 190) of AP A 100. The processor 100 may execute instructions stored in the memory 120 to transmit a CTS-to-self frame on the operating channel (e.g., channel A 190) of AP A 100. The CTS-to-self frame may include a BSS color. The processor 110 may execute instructions stored in the memory 120 to initiate the scan on the different wireless communication channel subsequent to the transmission of the CTS-to-self frame. AP A 100 may defer data transmissions, subsequent to the transmission of the CTS-to-self frame, from client devices, such as client device A 150, where the data transmission includes the BSS color associated with AP A 100.

As used herein, "access point" (AP) refers generally to transmitting and/or receiving points for any known or convenient wireless access technology which is now or may later become known. Specifically, although the term AP may include IEEE 802.11-based APs, the term AP is not intended to be limited solely to IEEE 802.11-based APs. APs generally function as an electronic device that is adapted to allow devices to wirelessly connect to a network via various communications standards.

The AP 100 may include other components such as a machine-readable storage medium or memory 120. As used herein, a "machine-readable storage medium" or "memory" be any electronic, magnetic, optical, or other physical storage apparatus to contain or store information such as executable instructions, data, and the like. For example, any machine-readable storage medium described herein may be any of Random Access Memory (RAM), volatile memory, non-volatile memory, flash memory, a storage drive (e.g., a hard drive), a solid state drive, any type of storage disc (e.g., a compact disc, a DVD, etc.), and the like, or a combination thereof. Any machine-readable storage medium described herein may be non-transitory.

As described above the AP may include a processor. As used herein, a "processor" may be at least one of a central processing unit (CPU), a semiconductor-based microprocessor, a graphics processing unit (GPU), a field-programmable gate array (FPGA) to retrieve and execute instructions, other electronic circuitry suitable for the retrieval and execution instructions stored on a machine-readable storage medium, or a combination thereof.

As used herein, 'network device' generally includes a device that is adapted to transmit and/or receive signaling and to process information within such signaling such as a station (e.g., any data processing equipment such as a computer, cellular phone, personal digital assistant, tablet devices, etc.), an access point, data transfer devices (such as network switches, routers, controllers, etc.) or the like. In some examples, the radio can also be utilized to receive communication requests from a plurality of devices such as the client devices 150-154.

As used herein, "CTS-to-self frame" includes a control frame utilized in an IEEE 802.11 wireless network protocol. The CTS-to-self frame may include certain parameters, such as BSS color, duration, receiver address, and other various control parameters. An AP may send a CTS-to-self frame to reserve a channel or to notify client devices and neighbor APs that a channel is busy.

As used herein, "basic service set" (BSS) includes an AP and the AP's associated client devices. "BSS color" includes a field in a frame or data transmission that identifies a particular BSS. For example, client device A 150 may associate with AP A 100. In an example, a BSS may include client device A 150 and AP A 100. AP A 100 may correspond to a specific BSS color. Data transmissions from client device A 150 may include the specific BSS color corresponding to AP A 100, to identify that client device A 150 is associated with AP A 100.

In an example, AP B 130 and AP C 135 may operate at wireless communication channels that may be the same as the operating channel, such as channel A 190, of AP A 100. Client devices, such as client device C 152 and client device E 154, may be associated with AP B 130. Client devices, such as client device B 151 and client device D 153, may be associated with AP C 135. Stated another way, AP B 130 may provide wireless access service to client device C 152 and client device E 154 and AP C 135 may provide wireless access service to client device B 151 and client device D 153. AP B 130 may cover an area such as coverage area 170 and AP C 135 may cover an area such as coverage area 180. AP B 130 and AP C 135 may provide wireless access service within coverage area 170 and coverage area 180, respectively. AP A 100 may provide wireless access service to client devices, such as client device A 150, within AP As 100 coverage area 160. Other APs with the same operating channel as AP A may provide a coverage area (e.g. coverage area 170 or coverage area 180) that may overlap the coverage area 160 of AP A 100. AP D 140 may operate at a different wireless communication channel than the operating channel of AP A 100. AP D 140 may also provide wireless access service to client devices. AP D 140 may be a rogue AP. A rogue AP may be an AP installed on a secure network without authorization from an administrator. A rogue AP may be malicious or a security threat.

In another example and as described above, AP A 100, AP B 130, and AP C 135 may each send frames or data transmissions that include a different BSS color. Upon initialization, the processor of the AP (for example, processor 110 of AP A 100) may set the BSS color associated with AP (e.g., AP A 100). The processor (e.g., processor 110) of the AP (e.g., AP A 100) may consider overlapping APs or other factors when determining the BSS color. In another example, the processor of AP A 100, AP B 130, and AP C 135 may set the same, different, or some other combination of BSS color.

In another example, AP A 100 may scan a different wireless communication channel. AP A 100 may scan the different wireless communication channel to discover other APs (such as AP D 140) or client devices not associated with AP A 100. In another example, AP A 100 may receive the instruction to scan from an appliance. In another example, the appliance is an upper layer appliance. In a further example, the upper layer appliance is a server. In a further example, the server is an analytics and location engine (ALE) server. In another example, AP A 100 may receive the instruction to scan from another network device.

As mentioned above, the CTS-to-self frame may include parameters. The parameters of the CTS-to-self frame may include the BSS color of the sending AP, such as AP A 100. The CTS-to-self frame may also include a network allocation vector (NAV) duration time. In an example, the NAV duration time may be the duration of the wireless communication channel scan. In another example, the instruction to scan includes the NAV duration time. In a further example, the AP (e.g., AP A 100) may set the NAV duration time in the CTS-to-self frame with the NAV duration time from the instruction to scan. In another example, the AP (e.g., AP A 100) sets the NAV duration time in the CTS-to-self frame without input from the instruction to scan.

As described above, the CTS-to-self frame may include a NAV duration time. In an example and as described above, AP A 100 may send the CTS-to-self frame to any network devices (such as neighboring APs or client devices associated or not associated with AP A 100) on the operating channel (such as channel A 190) of AP A 100. A client device (such as client device A 150, client device B 151, or client device C 152) on the operating channel (e.g., channel A 190) of AP A 100 may receive the CTS-to-self frame. A client device (such as client device A 150) may be associated with the sending AP (e.g., AP A 100). The BSS color in the CTS-to-self frame may indicate the association between the client device and the AP. In such examples, the BSS color may indicate the association between client device A 150 and AP A 100.

In an example, the client device (e.g., client device A 150) may receive the CTS-to-self frame and may match the BSS color included (in other words, the client device may associate with the AP). In such examples, the client device (e.g., client device A 150) may set the client devices (e.g., client device A 150) NAV parameter to the NAV duration time included in the CTS-to-self frame. During the NAV duration time, the client device (e.g., client device A 150) may cease data transmissions to the AP (e.g., AP A 100). Stated another way, the AP (e.g., AP A 100) may scan the wireless communication channel for a certain amount of time. During the duration of the scan, the AP (e.g., AP A 100) may defer data transmissions on the operating channel (e.g., channel A 190). In such examples, the AP (e.g., AP A 100) may set a CCA state to busy, thus deferring data transmissions on the operating channel. The CTS-to-self frame may notify client devices (such as client device A 150) to not transmit data during the scan time. The client device (e.g., client device A 150) may ensure that data is not transmitted by setting the client devices (e.g., client device A 150) NAV parameter to the NAV duration time set in the CTS-to-self frame. In another example, the client device (e.g., client device A 150), a neighboring AP (such as, AP B 130 and/or AP C 135), or some other network device may interpret the CTS-to-self frame as a notification that the operating channel (e.g., Channel A 190) may be busy for a duration. In such examples, the CTS-to-self frame may contain the duration that the operating channel (e.g., Channel A 190) is busy. In a further example, the duration may be the NAV duration time.

In an example and as described above, the client device (e.g., client device B 151 or client device C 152) may not be associated with the AP (e.g., AP A 100). The client device may be associated with a neighbor AP. In such examples, the client device (e.g., client device B 151 or client device C 152) may not set the client devices (e.g., client device B 151 or client device C 152) NAV parameter to the NAV duration time included in the CTS-to-self frame. The client device (e.g., client device B 151 or client device C 152) may cease data transmission during the time to determine whether the BSS color in the CTS-to-self frame matches the client devices (e.g., client device B 151 or client device C 152). The time to determine whether the BSS color in the CTS-to-self frame matches the client devices (e.g., client device B 151 or client device C 152) may be negligible in comparison to the wireless communication channel scan time.

In another example, the AP (e.g., AP A 100) may utilize an IEEE 802.11 wireless network protocol. In a further example, the AP (e.g., AP A 100) may utilize an IEEE 802.11ax wireless network protocol that is designed to increase overall spectral efficiency, especially in dense deployment scenarios. In another example, the neighboring AP's (e.g., AP B 130 and AP C 135) may utilize the IEEE 802.11 wireless network protocol. In a further example, other neighboring APs (e.g., AP B 130 and AP C 135) may utilize the IEEE 802.11ax wireless network protocol. In such examples, the AP (e.g., AP A 100) and neighboring APs (e.g., AP B 130 and AP C 135) may utilize the spatial re-use instructions in the IEEE 802.11ax wireless network protocol. The spatial re-use instructions may include the use of BSS colors as described above. Each AP (e.g., AP A 100, AP B 130, and AP C 135) may associate with a BSS and a BSS color. Client devices (e.g., client device A 150, client device B 151, client device C 152, client device D 153, and client device E 154) may transmit data based on the BSS color corresponding to an associated AP (e.g., AP A 100, AP B 130, and AP C 135). In such examples, client devices (e.g., client device B 151 and client device C 152) not associated with the AP (e.g., AP A 100) may continue to transmit data to the neighboring APs (e.g., AP B 130 and AP C 135) during the wireless communication scan.

Figure 2:
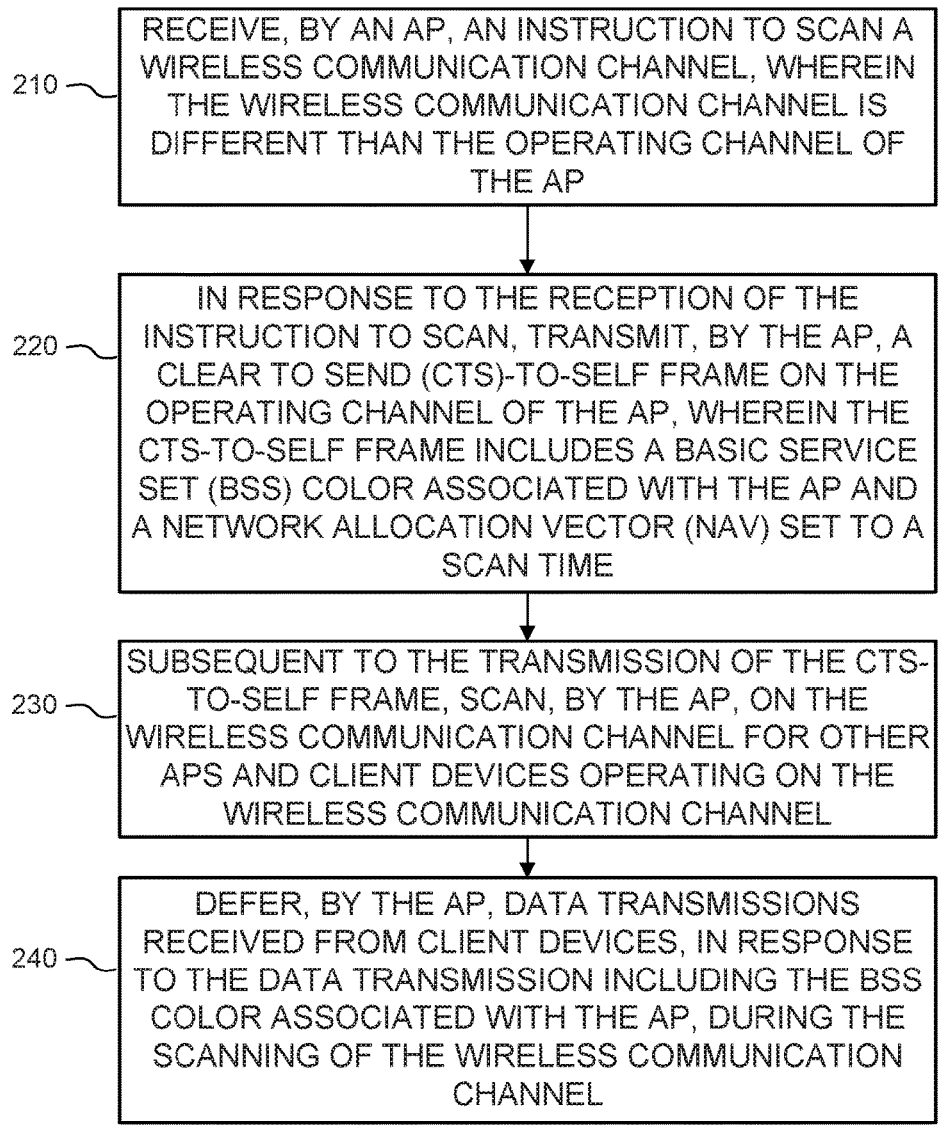
FIG. 2 is a flowchart of an example method of an access point sending a Clear To Send-to-self frame subsequent to reception of an instruction to scan a wireless communication channel.

FIG. 2 flowchart of an example method 200 of an AP 100 sending a CTS-to-self frame after receiving an instruction to scan a wireless communication channel. Although execution of method 200 is described below with reference to system of FIG. 1, other suitable systems for the execution of method 200 may be utilized. Additionally, implementation of method 200 is not limited to such examples.

At block 210, AP A 100 may receive an instruction to scan a wireless communication channel. AP A 100 may operate at an operating channel, channel A 190, which is different than the wireless communication channel. The instruction to scan may include instructions to scan for other APs (such as AP D 140) and client devices not associated with AP A 100 on the wireless communication channel. The other APs (such as AP D 140) may be rogue APs. The instruction to scan may include a duration of the scan. The instruction to scan may include more than one wireless communication channel to scan. Stated another way, the instruction to scan may include a list of wireless communication channels to be scanned. In a further example, the instruction to scan may or may not include an order for the wireless communication channels to be scanned. An appliance may send the instruction to scan to AP A 100. The appliance may be an upper layer appliance. The upper layer appliance may be a server. The server may be an ALE server.

At block 220, in response to the reception of the instruction to scan, AP A 100 may transmit a CTS-to-self frame on channel A 190 of AP A 100. In an example, AP A 100 may transmit the CTS-to-self frame prior to transmission of other frames, such as data frames. The CTS-to-self frame may include a BSS color associated with AP A 100 and a NAV duration time set to a scan time. As described above, the instruction to scan may include the duration of the scan or, stated another way, a scan time. AP A 100 may set the NAV duration time in the CTS-to-self frame with the duration of the scan or scan time. In another example, AP A 100 may determine the NAV duration time for the wireless communication channel scan. In an example, AP A 100 may set the BSS color of the AP at some time before the instruction to scan is received. AP A 100 may transmit the CTS-to-self frame on channel A 190 of AP A 100 to notify client devices (such as client device A 150) associated with AP A 100 of the wireless communication channel scan. The client devices (e.g., client device A 150) may update the client devices (e.g., client device A 150) NAV parameter to the NAV duration time in the CTS-to-self frame based on the BSS color in the CTS-to-self frame. In another example, the client devices (e.g., client device A 150) may check the BSS color in the CTS-to-self frame and if the BSS color in the CTS-to-self frame matches with the client devices (e.g., client device A 150) BSS color, then the client devices (e.g., client device A 150) may set the NAV parameter with the NAV duration time in the CTS-to-self frame.

In another example, a neighboring AP (e.g., AP B 130 or AP C 135) may operate at the same operating channel, such as channel A 190, of AP A 100. The neighboring APs (e.g., AP B 130 or AP C 135) coverage area (e.g., coverage area 170 or coverage area 180, respectively) may overlap with the coverage area 160 of AP A 100. In such examples, the neighboring AP (e.g., AP B 130 or AP C 135) may receive the CTS-to-self frame. In an example, the neighboring AP (e.g., AP B 130 or AP C 135) may include the same BSS color as AP A 100. In such examples, the neighboring AP (e.g., AP B 130 or AP C 135) may defer any further data transmissions on the neighboring APs (e.g., AP B 130 or AP C 135) operating channel for the NAV duration time. The neighboring AP (e.g., AP B 130 or AP C 135) may set a CCA to busy for the NAV duration time. In another example, the neighboring AP (e.g., AP B 130 or AP C 135) may not have the same BSS color. In such examples, the neighboring AP (e.g., AP B 130 or AP C 135) may defer data transmissions for the time to determine whether the BSS color does not match. In another example, the neighboring AP (e.g., AP B 130 or AP C 135) may not defer data transmissions as long as the received CTS-to-self frame signal strength of the detected CTS-to-self frame is below a threshold, allowing for better utilization of the neighboring APs (e.g., AP B 130 or AP C 135) operating channel.

At block 230, AP A 100 may start the scan subsequent to the transmission of the CTS-to-self frame. In an example, AP A 100 may send the CTS-to-self frame in the case that there are client devices associated with AP A 100. In another example, AP A 100 may not have clients devices associated with AP A 100. In such examples, AP A 100 may start the scan before, or without, sending the CTS-to-self frame. Subsequent to the transmission of the CTS-to-self frame, AP A 100 may go off-channel. Stated another way, AP A 100 may switch to the wireless communication channel (the wireless communication different than channel A 190). In such examples, AP A 100 may scan the wireless communication channel for other APs and client devices operating at the wireless communication channel. AP A 100 may stay on the wireless communication channel for the duration of the scan. Subsequent to the completion of the wireless communication channel scan, AP A 100 may switch to the operating channel, channel A 190, of AP A 100. In such examples, in response to the switch to the operating channel, channel A 190, of AP A 100, AP A may provide wireless access service to any client devices associated with AP A 100.

At block 240, AP A 100 may, during the scanning of the wireless communication channel, defer transmissions received from client devices (such as client device A 150), in response to the data transmission including the BSS color associated with AP A 100. In an example, AP A 100 may defer transmissions from client devices (e.g., client device A 150) associated with AP A 100. In another example, AP A 100 may defer other data transmissions from other client devices not associated with AP A 100, in response to the data transmission including the BSS color associated with AP A 100. In another example, AP A 100 may also defer any data transmissions from network devices on the operating channel of AP A 100.

Figure 3:
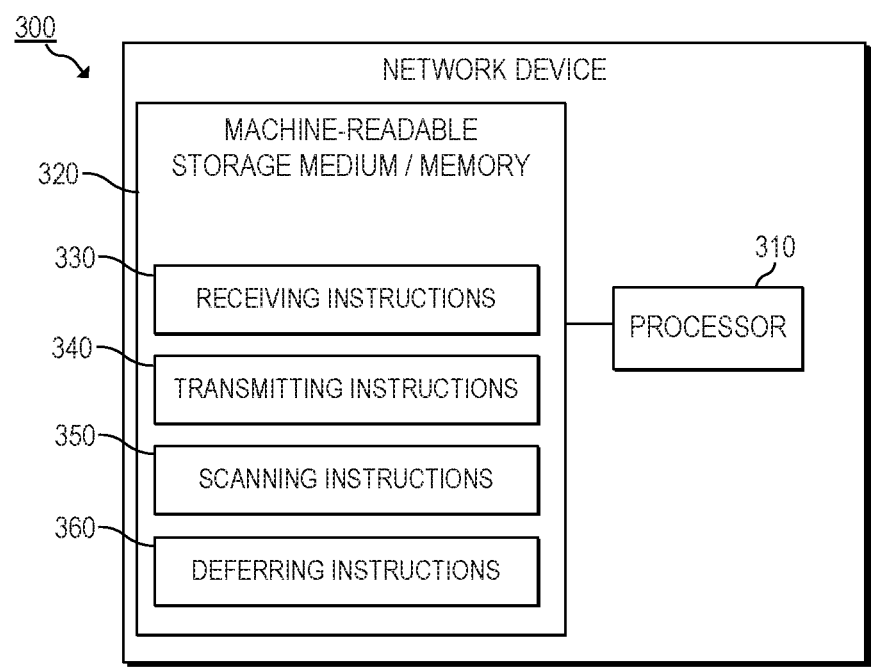
FIG. 3 is a block diagram of a network device capable of sending a Clear To Send-to-self frame subsequent to reception of an instruction to scan a different wireless communication channel.

FIG. 3 is a block diagram of a network device 300 capable of sending a CTS-to-self frame subsequent to reception of an instruction to scan a wireless communication channel. As described above, the network device 300 may include a machine-readable storage medium or memory 320 and a processor 310. The machine-readable storage medium 320 may store machine-readable instructions executable by the processor 310. The machine-readable instructions may include instructions 330 to receive an instruction to scan a wireless communication channel. The processor 310 may execute the instructions, allowing the network device 300 to receive the instruction to scan. The instruction to scan may specify the wireless communication channel to be scanned. The instruction to scan may include a duration time of the scan. The network device 300 may receive the instruction to scan from an appliance or a server.

The machine-readable instructions may include instructions 340 to transmit a CTS-to-self frame on the operating channel of the network device 300. In response to the reception of the instruction to scan, the processor 310 may execute the transmission instructions 340. In an example, the instructions 340, when executed by the processor 310, may form a CTS-to-self frame. In another example, the instructions 340, when executed by the processor 310, may add BSS color associated with the network device 300 to the parameters of the CTS-to-self frame. In another example, the instructions 340, when executed by the processor 310, may add the duration time, included in the instructions to scan, to the parameters of the CTS-to-self frame. The CTS-to-self frames duration time may indicate to a client device to set the NAV parameter of the client device to duration time included in the CTS-to-self frame.

The machine-readable instructions may also include instructions 350 to scan the wireless communication channel. The instructions 350, when executed by the processor 310, may start the scan of the wireless communication channel. The instructions 350 to scan the wireless communication channel may execute subsequent to the transmission of the CTS-to-self frame. In an example, the instruction to scan may include more than one wireless communication channel to scan. In a further example, network device 300 may scan the wireless communication channels, listed in the instruction to scan, sequentially or in some other order. The instruction to scan may include the order in which the wireless communication channels are to be scanned.

The machine-readable instructions may also include instructions 360 to defer transmissions from client devices associated with the network device 300 and other APs operating on operating channel of the network device 300. The instructions 360, when executed by the processor 310, may set the CCA state of the network device 300 to busy. The network device 300 may not accept data transmissions on the operating channel during the period where the CCA state is set to busy.

In another example, in response to the completion of the wireless communication channel scan, the processor 310 may execute instructions to change the CCA state of the network device 300 from busy. In another example, in response to the completion of the wireless communication channel scan, the processor 310 may execute instructions to switch the channel of the network device 300 from the wireless communication channel to the operating channel of the network device 300. In another example, in response to the completion of the wireless communication channel scan, the processor 310 may execute instructions to resume normal operation of the network device.

Although the flow diagram of FIG. 2 shows a specific order of execution, the order of execution may differ from that which is depicted. For example, the order of execution of two or more blocks or arrows may be scrambled relative to the order shown. Also, two or more blocks shown in succession may be executed concurrently or with partial concurrence. All such variations are within the scope of the present disclosure.

The present disclosure has been described using non-limiting detailed descriptions of examples thereof and is not intended to limit the scope of the present disclosure. It should be understood that features and/or operations described with respect to one example may be used with other examples and that not all examples of the present disclosure have all of the features and/or operations illustrated in a particular figure or described with respect to one of the examples. Variations of examples described will occur to persons of the art. Furthermore, the terms "comprise," "include," "have" and their conjugates, shall mean, when used in the present disclosure and/or claims, "including but not necessarily limited to."

It is noted that some of the above described examples may include structure, acts or details of structures and acts that may not be essential to the present disclosure and are intended to be examples. Structure and acts described herein are replaceable by equivalents, which perform the same function, even if the structure or acts are different, as known in the art. Therefore, the scope of the present disclosure is limited only by the elements and limitations as used in the claims

What is claimed is:

1. An access point (AP), comprising:
  a memory;
  a processor executing instructions from the memory to:
    receive an instruction to start a scan on a different wireless communication channel other than an operating channel of the AP;
    transmit a Clear To Send (CTS)-to-self frame on the operating channel of the AP to notify client devices associated with the AP and at least a neighboring AP that the operating channel is busy, wherein the control frame includes a basic service set (BSS) color associated with the AP;
    scan on the different wireless communication channel subsequent to transmitting the CTS-to-self frame; and
    defer a subsequent data transmission received from the client devices in response to the data transmission including the BSS color associated with the AP.

2. The AP of claim 1, wherein the scan on the different wireless communication channel detects other AP's and client device not associated with the AP.

3. The AP of claim 1, wherein the CTS-to-self frame includes a network allocation vector (NAV) duration time.

4. The AP of claim 3, wherein client devices with the BSS color associated with the AP set a NAV parameter to the NAV duration time included with the CTS-to-frame.

5. The AP of claim 3, wherein the processor further executes instructions from the memory to set the NAV duration time in the CTS-to-self frame to a wireless communication channel scan time.

6. The AP of claim 5, wherein the wireless communication channel scan time is an amount of time that the AP defers subsequent data transmissions.

7. The AP of claim 1, wherein the AP utilizes an IEEE 802.11ax wireless network protocol.

8. The AP of claim 1, wherein the operating channel of the AP overlaps with other APs and client devices not associated with the AP.

9. A method comprising:
  receiving, by an access point (AP), an instruction to scan a wireless communication channel, wherein the wireless communication channel is different than the operating channel of the AP;
  in response to the reception of the instruction to scan, transmitting, by the AP, a Clear To Send (CTS)-to-self frame on the operating channel of the AP, wherein the CTS-to-self frame includes a basic service set (BSS) color associated with the AP and a network allocation vector (NAV) set to a scan time;
  subsequent to the transmission of the CTS-to-self frame, scanning, by the AP, on the wireless communication channel for other APs and client devices operating on the wireless communication channel; and
  deferring, by the AP, data transmissions received from client devices, in response to the data transmission including the BSS color associated with the AP, during the scanning of the wireless communication channel.

10. The method of claim 9, wherein the instruction to scan includes the scan time.

11. The method of claim 9, wherein the BSS color associated with the AP is preset.

12. The method of claim 9, wherein the NAV of the CTS-to-self frame is not applied to other APs and client devices with data transmissions that do not include the BSS color associated with the AP.

13. A non-transitory machine-readable storage medium encoded with instructions executable by at least one processor of network device, the machine-readable storage medium comprising instructions to:
  receive an instruction to scan a different wireless communication channel other than an operating channel of the network device;
  in response to the reception of the instruction to scan, transmit a CTS-to-self frame on the operating channel of the network device, wherein the CTS-to-self frame includes a basic service set (BSS) color associated with the AP;
  in response to a completion of transmission of the CTS-to-self frame, scan the different wireless communication channel for other APs and client devices not associated with the AP; and
  during the scan of the different wireless communication channel, defer data transmissions including the BSS color associated with the AP, wherein the data transmissions are received from client devices and other APs.

14. The non-transitory machine-readable storage medium of claim 13, wherein the CTS-to-self includes a network allocation vector (NAV) duration time equal to the duration of the scan of the different wireless communication channel.

15. The non-transitory machine-readable storage medium of claim 14, wherein the CTS-to-self frame includes a request for client devices that include the BSS color associated with the AP to update NAV parameters with the NAV duration time included in the CTS-to-self frame.

* * * * *